US009740593B2

(12) United States Patent
Boxall et al.

(10) Patent No.: US 9,740,593 B2
(45) Date of Patent: Aug. 22, 2017

(54) COMPARATIVE PROGRAM EXECUTION THROUGH CONTROL OF TWO OR MORE DEBUG SESSIONS TO AUTOMATICALLY DETERMINE EXECUTION DIFFERENCES

(71) Applicant: International Business Machines Corporation, Armonk, NY (US)

(72) Inventors: Alan S. Boxall, Markham (CA); James T. Guan, Toronto (CA); Roger H. E. Pett, Toronto (CA); Trong Truong, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 14/592,573

(22) Filed: Jan. 8, 2015

(65) Prior Publication Data
US 2016/0203072 A1    Jul. 14, 2016

(51) Int. Cl.
*G06F 9/44* (2006.01)
*G06F 9/45* (2006.01)
(Continued)

(52) U.S. Cl.
CPC ............ *G06F 11/3636* (2013.01); *G06F 8/30* (2013.01); *G06F 8/70* (2013.01); *G06F 11/16* (2013.01);
(Continued)

(58) Field of Classification Search
CPC .............. G06F 11/362; G06F 11/3664; G06F 11/3624; G06F 11/3636; G06F 8/71;
(Continued)

(56) References Cited

U.S. PATENT DOCUMENTS 4,730,315 A     3/1988  Saito et al.
5,371,746 A  *  12/1994 Yamashita ............ G06F 11/362
                                                                712/227
(Continued)

OTHER PUBLICATIONS

Rick Leatherman et al., An embedded debugging architecture for SoCs, 2005 IEEE, [Retrieved on Feb. 21, 2017]. Retrieved from the internet: <URL: http://ieeexplore.ieee.org/stamp/stamp.jsp?arnumber=1405795> 5 Pages (12-16).*

(Continued)

*Primary Examiner* — Thuy Dao
*Assistant Examiner* — Anibal Rivera
(74) *Attorney, Agent, or Firm* — Maeve M. Carpenter; Edell, Shapiro & Finnan, LLC

(57) ABSTRACT

According to embodiments of the present invention, machines, systems, methods and computer program products for controlling two or more remote sessions are provided. Two or more remote sessions are synchronized to control each session using a common interface. One or more executable commands are sent to each remote session at substantially the same time using the common interface to control operation of that remote session. Data generated by each remote session from executing the commands is received and analyzed to identify one or more differences in data generated by each remote session. The one or more identified differences in the data are displayed on the common interface. An indication may be provided regarding possible root causes of the differences in the data generated by each remote session. Each remote session includes a program debug session. A report comprising the one or more identified differences in the data may be generated.

19 Claims, 6 Drawing Sheets

(51) Int. Cl.
  *G06F 11/36* (2006.01)
  *G06F 11/16* (2006.01)
  *G06F 9/455* (2006.01)

(52) U.S. Cl.
  CPC ...... *G06F 11/1641* (2013.01); *G06F 11/3664* (2013.01); *G06F 11/3688* (2013.01); *G06F 9/45516* (2013.01); *G06F 11/362* (2013.01); *G06F 11/3612* (2013.01)

(58) Field of Classification Search
  CPC ............... G06F 11/3688; G06F 11/321; G06F 11/3648; G06F 11/3656; G06F 11/3628; G06F 11/3612; G06F 11/267; G06F 11/2294; G06F 8/34; G06F 8/30; G06F 9/45516
  See application file for complete search history.

(56) References Cited

U.S. PATENT DOCUMENTS

| | | | | |
|---|---|---|---|---|
| 5,475,843 | A | 12/1995 | Halviatti et al. | |
| 5,600,789 | A * | 2/1997 | Parker | G06F 11/3688 714/38.11 |
| 5,819,093 | A * | 10/1998 | Davidson | G06F 11/3664 714/25 |
| 5,862,381 | A | 1/1999 | Advani et al. | |
| 5,892,941 | A * | 4/1999 | Khan | G06F 11/3664 703/22 |
| RE36,422 | E | 11/1999 | Pazel | |
| 6,011,920 | A * | 1/2000 | Edwards | G06F 11/3664 714/E11.21 |
| 6,091,896 | A * | 7/2000 | Curreri | G06F 11/3628 714/E11.21 |
| 6,125,375 | A | 9/2000 | Atkins et al. | |
| 6,247,020 | B1 | 6/2001 | Minard | |
| 6,295,613 | B1 | 9/2001 | Bates et al. | |
| 6,467,082 | B1 | 10/2002 | D'Arcy et al. | |
| 6,516,460 | B1 | 2/2003 | Merks et al. | |
| 6,593,940 | B1 | 7/2003 | Petersen et al. | |
| 6,611,276 | B1 | 8/2003 | Muratori et al. | |
| 6,654,911 | B1 | 11/2003 | Miles | |
| 6,654,950 | B1 | 11/2003 | Barnishan | |
| 6,671,825 | B1 | 12/2003 | Joshi et al. | |
| 6,721,941 | B1 | 4/2004 | Morshed et al. | |
| 6,829,733 | B2 | 12/2004 | Richardson et al. | |
| 6,941,492 | B1 * | 9/2005 | Ezra | G06F 11/362 714/27 |
| 6,961,924 | B2 | 11/2005 | Bates et al. | |
| 6,964,036 | B2 | 11/2005 | Bates et al. | |
| 6,986,124 | B1 * | 1/2006 | Field | G06F 8/30 709/230 |
| 7,028,223 | B1 | 4/2006 | Kolawa et al. | |
| 7,149,900 | B2 | 12/2006 | Rothrock | |
| 7,150,002 | B1 | 12/2006 | Anderson et al. | |
| 7,174,536 | B1 | 2/2007 | Kothari et al. | |
| 7,203,926 | B2 | 4/2007 | Bogle et al. | |
| 7,210,127 | B1 | 4/2007 | Rangachari | |
| 7,310,777 | B2 | 12/2007 | Cirne | |
| 7,441,158 | B1 * | 10/2008 | Legako | G06F 11/2294 714/46 |
| 7,464,297 | B2 | 12/2008 | Potter et al. | |
| 7,512,934 | B2 | 3/2009 | Gatlin et al. | |
| 7,530,056 | B1 * | 5/2009 | Yaari | G06F 11/3604 717/128 |
| 7,673,180 | B1 * | 3/2010 | Chen | G06F 11/362 714/38.11 |
| 7,757,126 | B2 | 7/2010 | Vidiyala | |
| 7,827,438 | B2 | 11/2010 | Tarta | |
| 7,844,952 | B2 | 11/2010 | Barsness et al. | |
| 7,844,955 | B2 | 11/2010 | Tateishi et al. | |
| 7,958,486 | B2 | 6/2011 | Tsyganskiy et al. | |
| 8,095,914 | B1 | 1/2012 | Singh et al. | |
| 8,302,050 | B1 * | 10/2012 | Hollander | G01R 31/31705 716/106 |
| 8,336,029 | B1 * | 12/2012 | McFadden | G06F 9/45516 717/100 |
| 8,365,149 | B2 | 1/2013 | Frank et al. | |
| 8,402,442 | B1 * | 3/2013 | Chan | G06F 11/267 714/25 |
| 8,429,553 | B2 * | 4/2013 | Maybee | G06F 8/34 715/736 |
| 8,468,502 | B2 | 6/2013 | Lui et al. | |
| 8,683,438 | B2 * | 3/2014 | Orrick | G06F 11/362 717/124 |
| 8,752,017 | B2 * | 6/2014 | Hossain | G06F 11/362 717/124 |
| 2001/0004766 | A1 * | 6/2001 | Koyama | G06F 11/3664 717/128 |
| 2004/0040013 | A1 * | 2/2004 | Kalra | G06F 11/362 717/129 |
| 2004/0168155 | A1 * | 8/2004 | O'Farrell | G06F 11/3664 717/129 |
| 2005/0022170 | A1 * | 1/2005 | Brown | G06F 11/3664 717/125 |
| 2005/0166094 | A1 * | 7/2005 | Blackwell | G06F 11/3664 714/38.14 |
| 2005/0223359 | A1 * | 10/2005 | Rao Nagaraju | G06F 11/362 717/124 |
| 2006/0048098 | A1 * | 3/2006 | Gatlin | G06F 11/321 717/124 |
| 2006/0064676 | A1 * | 3/2006 | Chavan | G06F 11/3628 717/124 |
| 2006/0101405 | A1 | 5/2006 | Buschardt et al. | |
| 2006/0123395 | A1 | 6/2006 | Andrews et al. | |
| 2006/0174225 | A1 * | 8/2006 | Bennett | G06F 11/362 717/124 |
| 2006/0277231 | A1 | 12/2006 | Kral et al. | |
| 2008/0109793 | A1 * | 5/2008 | Buettner | G06F 11/3648 717/129 |
| 2008/0276226 | A1 * | 11/2008 | Farchi | G06F 11/3644 717/129 |
| 2009/0106739 | A1 * | 4/2009 | Weatherbee | G06F 11/362 717/127 |
| 2009/0138853 | A1 * | 5/2009 | Orrick | G06F 11/362 717/124 |
| 2009/0222795 | A1 | 9/2009 | Frank et al. | |
| 2009/0328005 | A1 * | 12/2009 | Miskelly | G06F 11/3636 717/125 |
| 2010/0318972 | A1 | 12/2010 | Xu et al. | |
| 2011/0154301 | A1 * | 6/2011 | Klinker | G06F 11/362 717/135 |
| 2011/0225460 | A1 * | 9/2011 | Stairs | G06F 11/362 714/37 |
| 2011/0283239 | A1 * | 11/2011 | Krishnan | G06F 11/3636 715/853 |
| 2012/0084757 | A1 * | 4/2012 | Tamiya | G06F 11/3656 717/124 |
| 2012/0117541 | A1 * | 5/2012 | Bates | G06F 11/362 717/125 |
| 2012/0151445 | A1 | 6/2012 | Maybee | |
| 2012/0151446 | A1 * | 6/2012 | Sathya | G06F 11/3656 717/125 |
| 2012/0317443 | A1 * | 12/2012 | Chandran | G06F 11/3664 714/38.1 |
| 2013/0091493 | A1 | 4/2013 | Sowerby et al. | |
| 2013/0205280 | A1 * | 8/2013 | Bragdon | G06F 11/3664 717/125 |
| 2013/0219363 | A1 * | 8/2013 | Wu | G06F 11/3664 717/124 |
| 2014/0237296 | A1 * | 8/2014 | Shanahan | G06F 11/3664 714/38.14 |
| 2016/0019133 | A1 * | 1/2016 | Forgács | G06F 11/3612 717/128 |

OTHER PUBLICATIONS

Manuel Palmieri et al., Comparison of Cross-Paltform Mobile Development Tools, 2012 IEEE, [Retrieved on Feb. 21, 2017]. Retrieved from the internet: <URL: http://ieeexplore.ieee.org/stamp/stamp.jsp?arnumber=6376023> 8 Pages (179-186).*

(56) References Cited

OTHER PUBLICATIONS

IP.com, "System and Methods to Reduce Time Taken to Manually Execute GUI Tests across Multiple Different Computer System Configurations", IPCOM000220506D, Aug. 2, 2012, 10 pages.

Fredrik Manne, et al., "Automating the Debuggin of Large Numerical Codes", Published in the book "Modern software tools for scientific computing", Binkhauser Boston Inc. Combridge, MA, USA 1997 [retrieved on Mar. 6, 2011]. Retrieved from the internet: <URL:http://citeseerx.ist.psu.edu/viewdoc/download?doi=10.1.1.42.5307&rep=rep1&type=pdf>; pp. 1-14.

Lee, et al. "A Development of Remote Tracepoint Debugger for Run-time Monitoring and Debugging of Timing Constraints on Qplus-P RTOS", IEEE Workshop on Software Technologies for Future Embedded System (WSTFES 03), pp. 1-4, (2003).

Cleve, et al., "Locating Causes of Program Failures", ICSE (2005), pp. 1-10.

Abramson, "A Debugging Tool for Software Evolution", 1995, IEEE; <retrieved on Jun. 26, 2012>; Retrieved from Internet <URL:http://ieeexplore.ieee.org/stamp/stamp.jsp?tp=&arnumber=514716>;pp. 282-290.

Watson, Abramson, "The Architecture of a Parallel Relative Debugger", Proceedings for the 13th International Conference on Parallel and Distributed Computer Systems, 2000; <retrieved on Jun. 26, 2012>; Retrieved from Internet <URL:http://citeseerx.ist.psu.edu/viewdoc/download?doi=10.1.1.121.8728&rep=rep1&type=pdf>;pp. 1-8.

Searle, "Automatic Relative Debugging", 2006, Queensland University of Technology; [retrieved on Jun. 11, 2013]; Retrieved from Internet <URL:http://eprints.qut.edu.au/16445/1/Aaron_Searle_Thesis.pdf>;pp. 1-10;pp. 140-150.

Marlow, et al., "A Lightweight Interactive Debugger for Haskell"; 2007 ACM; [retrieved on Oct. 19, 2013]; Retrieved from Internet <URL:http://dl.acm.org/citation.cfm?id=1291201>;pp. 13-24.

Linderman, et al., "Declaratively Defining Domain-Specific Language Debuggers"; 2011 ACM; [retrieved on Oct. 19, 2013]; Retrieved from Internet <URL:http://dl.acm.org/citation.cfm?id=2047862>;pp. 127-136.

Anderson, et al., "Efficient tracing and performance analysis for large distributed systems"; 2009 IEEE; [retrieved on Oct. 19, 2013]; Retrieved from Internet <URL:http://ieeexplore.ieee.org/stamp/samp.jsp?tp=&arnumber=5366158>; pp. 1-10.

Tanter, et al., "Back to the Future: Omniscient Debugging", 2009, IEEE; [retrieved on Oct. 19, 2013]; Retrieved from Internet <URL:http://ieeexplore.ieee.org/stamp/samp.jsp?tp=&arnumber=5287015>;pp. 78-85.

\* cited by examiner

Debug
File Edit Navigate Search Project Run Window Help

| Debug | Servers | | Breakpoints | Registers | Monitors | Modules |

▼ SORT [Incoming Remote Debug Session]
  ▼ Platform: MVS-PICL(WIN) Connection: 127.0.0.1:54865
    ▼ Thread:1 - INIT (Runnable)
      INIT : SORT
    Process: 83890132 Program: SORT
▼ SORT [Incoming Remote Debug Session]
  ▼ Platform: MVS-PICL(WIN) Connection: 127.0.0.1:54871
    ▼ Thread:1 - SORT (Runnable)
      SORT : SORT
    Process: 33555948 Program: SORT ☑ Line [SORT.list:71]
☑ Line [SORT.list:71]
☑ Load [SAM2]

310

320

SORT.list.cob
SORT.list.cob: 1

MOVE NAMESTR TO TABLE-KEY (COUNTER)
    MOVE "DAT" TO PREFIX
    MOVE NAMESTR TO TABLE-DATA (COUNTER)
END-PERFORM.
    MOVE TABLE-MAX TO TABLE-SIZE.         330
    //EXIT PROGRAM//
    END PROGRAM "init".
    END PROGRAM "SORT".

SORT.list.cob: 2

MOVE NAMESTR TO TABLE-KEY (COUNTER)
    MOVE "DAT" TO PREFIX
    MOVE NAMESTR TO TABLE-DATA (COUNTER)
END-PERFORM.
    MOVE TABLE-MAX TO TABLE-SIZE.         330
    //EXIT PROGRAM//
    END PROGRAM "init".
    END PROGRAM "SORT".

Variables

| Name | Value |
|---|---|
| TABLE-MAX | +01600 |
| TABLE-SIZE | +01600 |

340

Console | Tasks | Debug Console | Problems | Executables | Memory | Progress | Compiled Code | Perform Hierarchy Search | Software Analyze

COMPARATIVE PROGRAM EXECUTION THROUGH CONTROL OF TWO OR MORE DEBUG SESSIONS TO AUTOMATICALLY DETERMINE EXECUTION DIFFERENCES

BACKGROUND

1. Technical Field

Present invention embodiments relate to program execution in different platforms, and more specifically, to concurrently controlling and linking two or more debug sessions for comparative program execution.

2. Discussion of the Related Art

Developers porting software to new hardware running on the same Operating System (OS), e.g., moving from x86 Linux to Power Linux or Linux on z, etc., often face challenges in resolving execution differences on the new platform.

A developer may diagnose execution problems on the new platform by comparing the behavior of the object compiled code or binary executable running on the new platform with the object compiled code or binary executable running on the reference platform. While this process allows a developer to isolate runtime issues, this process is manually driven, with a developer typically viewing each executable in a debugger and examining each process in parallel. Frequently, the developer is overwhelmed with a myriad of details regarding controlling two debugging sessions independently, and also, in manually keeping track of differences in variables, registers, or memory.

SUMMARY

According to embodiments of the present invention, machines, systems, methods and computer program products for concurrently controlling and linking/synchronizing two or more remote sessions are provided. Each remote session may include a program debug session. Two or more remote sessions are synchronized, e.g., using an application such as a client debug engine running on a client system, to control each session using a common interface. One or more executable commands are sent to each remote session at substantially the same time using the common interface to control operation of that remote session. Data generated by each remote session from executing the commands is received and analyzed to identify one or more differences in data generated by each remote session. The one or more identified differences in the data are displayed on the common interface.

Accordingly, present invention embodiments include simplifying and automating the debugging process. By controlling a plurality of debugging processes in a synchronized manner through a client system, a user may identify and resolve program execution issues in a more efficient manner, as compared to manually executing each debugging process on a separate platform and manually comparing data generated by program execution. Present invention embodiments also allow for automatic detection of differences in program execution.

In preferred embodiments, an indication may be provided, generated by the client debug engine, regarding possible root causes of the differences in the data generated by each remote session. Providing an indication as to possible root causes of differences in data may accelerate resolution of causes of variations in program execution. Optionally, a report comprising the one or more identified differences in the data may be generated.

In other preferred embodiments, the data may include one or more of register values, pointer values, values stored in memory, etc. By monitoring data related to or generated by program execution, e.g., register values, memory, pointer values, etc., specific differences in platform execution at a specific place in program execution may be quickly identified.

In still other preferred embodiments, the data may be filtered to identify a subset of identified differences within a larger set of identified differences based on a known cause for the subset of identified differences. By filtering data to identify a subset of identified differences within a larger set of identified differences, identification and in some cases resolution of differences in program execution may be accelerated and simplified.

Other preferred embodiments include generating executable commands by a user of the common interface. Such a configuration allows for unified control of multiple debugging processes, e.g., a single command issued by a user may be applied to each debugging process to synchronize debugging processes and accelerate the development cycle. In still other preferred embodiments, each remote session includes a program debug session. Optionally, the executable commands may be provided in the form of a batch file. By performing program execution in batch mode, data from different computing platforms may be generated and collectively analyzed, further accelerating the development process.

These and other aspects, features and embodiments of the present invention will be understood with reference to the drawing figures and the detailed description herein, and will be realized by way of the various elements and combinations particularly pointed out in the appended claims. It is to be understood that both the foregoing general description and the following brief description of the drawings and detailed description are examples and explanatory of preferred embodiments of the invention, and are not restrictive of present invention embodiments, as claimed.

BRIEF DESCRIPTION OF THE SEVERAL VIEWS OF THE DRAWINGS

Generally, like reference numerals in the various figures are utilized to designate like components.

FIG. 3 is an illustration showing an example of a User Interface (UI) for displaying various aspects of controlling and linking debug sessions across different platforms in accordance with an embodiment of the present invention.

DETAILED DESCRIPTION

Present invention embodiments automatically link and control or synchronize two debug sessions running on different platforms, and automatically compare and detect differences in program execution. This may be accomplished by comparing the data from each of the debug sessions interactively, e.g., with a user stepping through an executable file, or non-interactively, e.g., with a user executing the object compiled code or binary executable in a batch mode. Present invention embodiments allow a user to quickly and easily identify, in an automated manner, behavioral differences in execution arising from porting an application to an environment with a different platform as compared to the original environment. Existing techniques leave a user to manually execute each debug session in a selected environment, and to manually monitor and identify differences in program execution, a process that is both time consuming and cumbersome, as a large number of variables may need to be tracked in order to identify differences. Additionally, present invention embodiments allow for automatic detection of differences in program execution on different platforms, thereby saving time and streamlining the debugging process.

In preferred embodiments, an indication may also be provided as to possible root causes of differences in data, arising from differences in program execution between the reference platform and the other platform(s). Providing such indications may further accelerate the debugging process, allowing known differences to be quickly identified and accounted for.

In other preferred embodiments, identified differences corresponding to differences in data arising during program execution due to a known cause may be filtered out from among a larger set of identified differences, to produce a smaller subset of differences, thereby reducing the identified differences to a smaller subset of differences to further accelerate the debugging process.

In still other preferred embodiments, executable commands may be generated by a user of the common interface and applied to each debugging process in each remote environment. Such a configuration allows for unified control of multiple debugging processes, thereby saving time and further streamlining the debugging process.

Figure 1A:
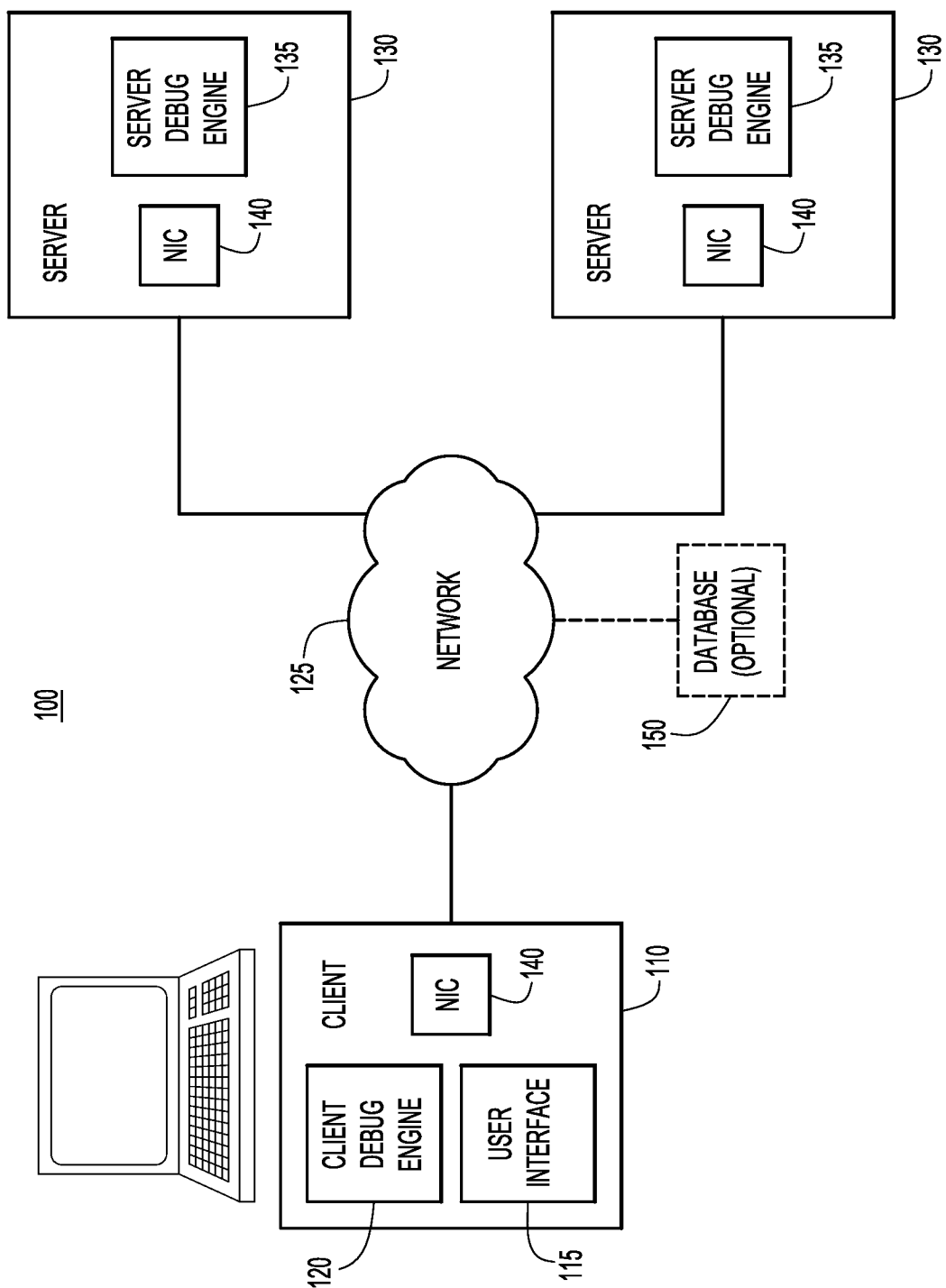
FIG. 1A is an illustration showing an example computing environment for con trolling program execution across different platforms in accordance with an embodiment of the present invention.

An example environment for use with present invention embodiments is illustrated in FIG. 1A. Specifically, the environment includes one client or end-user system 110, and two or more server systems 130. Server systems 130 and client system 110 may be remote from each other and communicate over a network 125. The network may be implemented by any number of any suitable communications media (e.g., wide area network (WAN), local area network (LAN), Internet, Intranet, etc.). Alternatively, server systems 130 and client system 110 may be local to each other, and communicate via any appropriate local communication medium (e.g., local area network (LAN), hardwire, wireless link, Intranet, etc.). In still other embodiments, server systems 130 may be located in a cloud computing environment, accessed remotely by client system 110.

It is understood that while the examples provided herein refer to two debug processes running concurrently, these examples are not intended to be limiting. In additional embodiments, any number of debug processes may be run concurrently, and the results compared with the designated reference and analyzed accordingly.

Client system 110 enables users to submit commands, either in an interactive mode, e.g., step, breakpoint, step in, step out, etc., or in a batch file mode, to two or more server systems 130 for command execution in two or more different computing environments with different platforms. The client system 110 includes a user interface (UI) 115 that enables selection and linking of the two or more different computing environments, as well as displays aspects of processes associated with a client debug engine 120, in an interactive mode or a batch mode. The client-side debug engine 120 establishes a link with the selected two or more remote debug sessions, sends commands to each server 130 hosting a selected debug session, as well as receives results from each debug session. The server system 130 includes a server side debug engine 135, which communicates with the client debug engine, to perform commands received from the client debug engine as well as send results of executed commands to the client 110. Both the client system 110 and the server 130 may include network interface cards (NICs) 140 for communication across network 125.

In preferred embodiments, a standalone database system 150 (optional) may store various information for the comparison and analysis of results returned by each server debug session (e.g., variables, values stored in registers, etc.). The database system may be implemented by any conventional or other database or storage unit, may be local to or remote from server systems 130 and client system 110, and may communicate via any appropriate communication medium (e.g., local area network (LAN), wide area network (WAN), Internet, hardwire, wireless link, Intranet, etc.).

Client system 110 may present a graphical user (e.g., GUI, etc.) or other interface (e.g., command line prompts, menu screens, etc.) to solicit commands and instructions from users pertaining to the desired object compiled code or binary execution and analysis, and may provide reports including analysis results (e.g., values stored in registers, variables, reasons for differences in object compiled code or binary execution between the two environments, etc.).

Figure 1B:
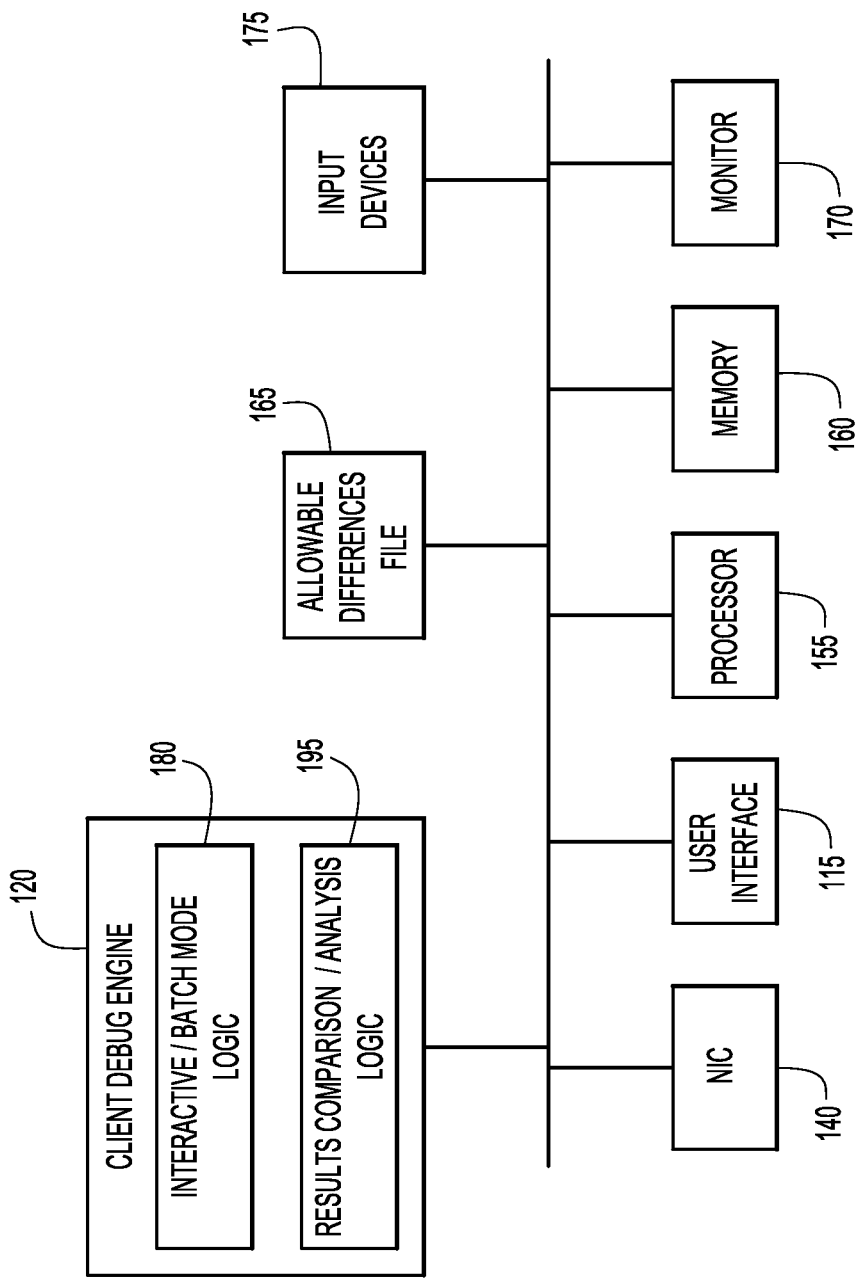
FIG. 1B shows an illustration of an example client system architecture for comparing differences in program execution across different platforms in accordance with an embodiment of the present invention.

Referring to FIG. 1B, an example of client system 110 architecture is provided. Client system 110 may be implemented by any conventional or other computer systems preferably equipped with a display or monitor 170, a user interface 115, a base (e.g., including at least one processor 155, one or more memories 160 and/or internal or external network interfaces or communications devices 140 (e.g., modem, network cards, etc.)), optional input devices 175 (e.g., a keyboard, mouse or other input device), and any commercially available and custom software (e.g., server/communications software, client debug engine, browser/interface software, etc.). Client debug engine 120 may comprise computer readable instructions, which may be stored in memory 160, or as a separate memory (as shown herein), comprising logic 180 for operating in interactive or batch mode as well as logic 195 for comparing results and analyzing the results to provide possible reasons for differences in results. In preferred embodiments, an exceptions or "allowable differences" file 165 may be included, comprising known reasons for differences in platform execution, e.g., file numbers, size of registers, etc.

Figure 1C:
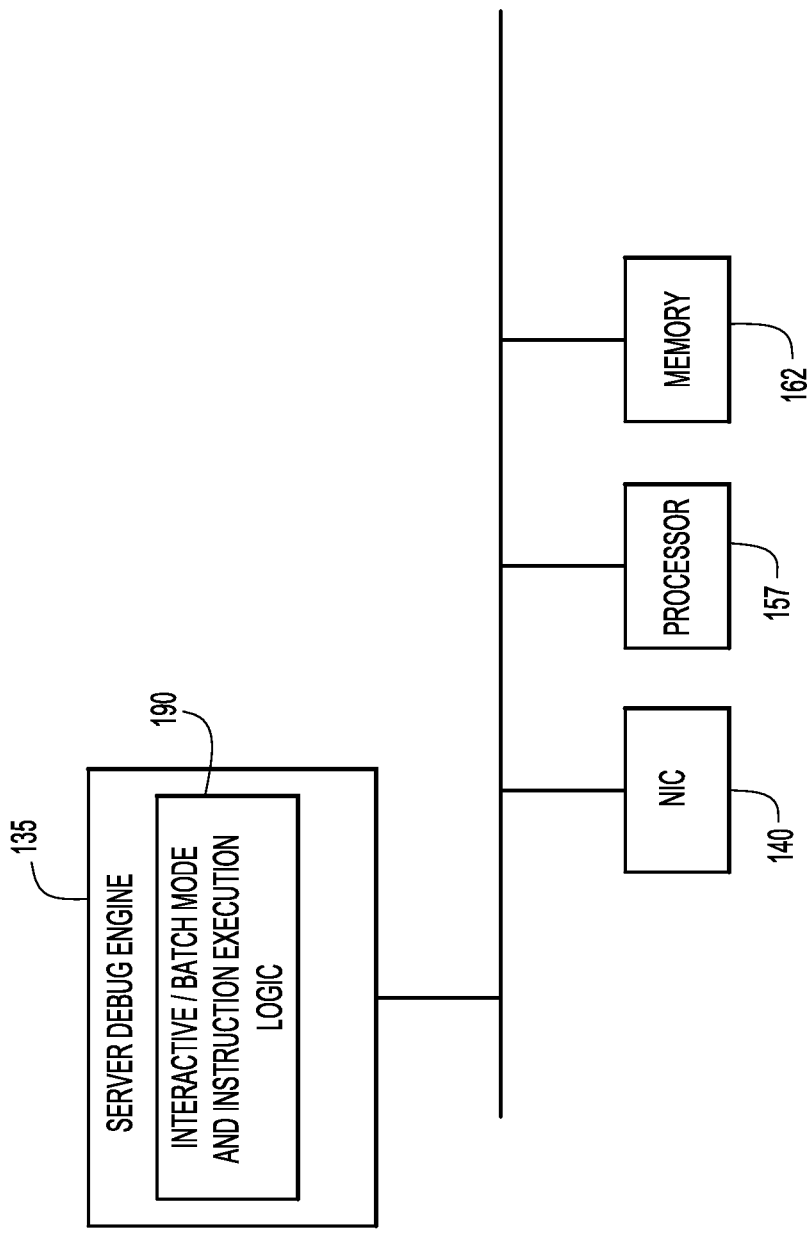
FIG. 1C shows an illustration of an example server system architecture for controlling program execution across different platforms in accordance with an embodiment of the present invention.

Referring to FIG. 1C, an example of server system 130 architecture is provided. Server system 130 may be implemented by any conventional or other computer systems preferably equipped with a base (e.g., including at least one processor 157, one or more memories 162 and/or internal or external network interfaces or communications devices 140

(e.g., modem, network cards, etc.)) and any commercially available and custom software (e.g., server/communications software, server debug engine, etc.). Server debug engine 135 may comprise computer readable instructions, which may be stored in memory 162, or as a separate memory (as shown herein), comprising logic 198 for operating in interactive or batch mode and executing instructions provided by client system 110.

Figure 2A:
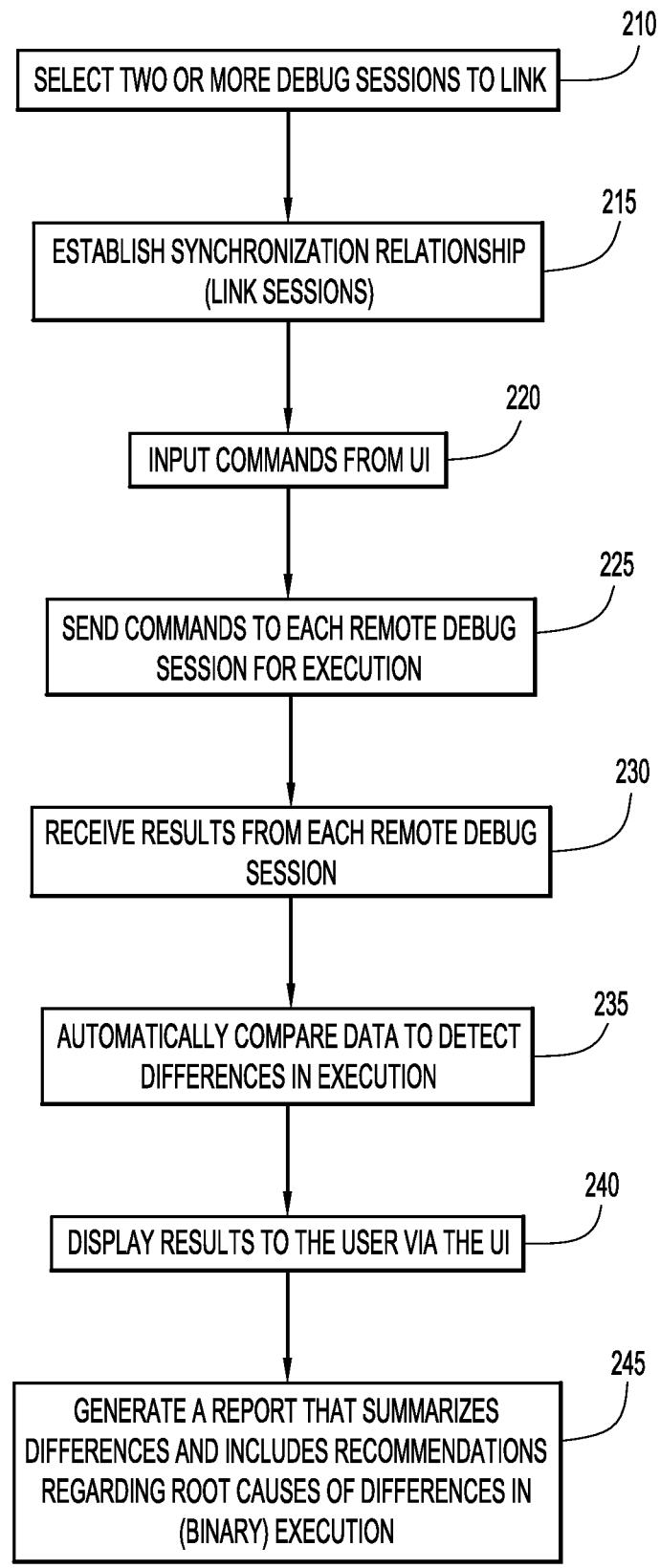
FIG. 2A is an example of a procedural flowchart showing, in a user interactive mode, comparative program execution across different platforms in accordance with an embodiment of the present invention.

Referring to FIG. 2A, an example flow chart is shown for automatically linking and controlling or synchronizing two remote debug processes running on separate platforms and automatically detecting differences, in an interactive manner (e.g., via debug engines 120, 135, server 130 and/or client 110). This allows for each of the executables in each debug session to be controlled as a single entity, rather than multiple independent processes, as well as provides the ability for automatic detection of differences in data from each of the debuggers, as the user is stepping through a program.

At operation 210, a user selects one or more debug sessions to link. In some embodiments, a user may select, using UI 115 of client system 110, a debug session from a porting platform and a debug session from a reference platform and link the two. In some aspects, linking may be performed using a handshaking protocol between client system 110 and servers 130, hosting the selected debug sessions for establishing the connection for each debug session being controlled. Once the debugging sessions are linked, a synchronization relationship is established at operation 215. A link generally refers to a communication path between a UI and designated debug sessions on the platform, usually set up by a user, e.g., using a Transmission Control Protocol (TCP) connection. Synchronization generally refers to debug sessions placed in the same, starting state or same known state, e.g., the beginning of a program prior to program execution, executing a portion of the code and stopping upon reaching a particular location in the code using a stop command, etc. For example, the client system 110 may send the following commands to server 130 to establish synchronization: (1) set a breakpoint at a starting location (e.g., the program entry point), or another defined location in the program code, and (2) run/execute code until reaching the breakpoint. The debug sessions will then be synchronized so that all sessions stop at the same breakpoint or location in program code.

At operation 220, using the UI, the client debug engine, now governing two or more debug sessions, e.g., the reference platform and the platform to which the software is to be ported to, may be used to control all linked debug sessions and collect data from all sessions simultaneously. For example, using the UI, a user may input a command to step through the executable code, may set breakpoints, etc., within the debugger which will be applied to all remote debug sessions simultaneously.

At operation 225, the commands are sent to each remote debug session for execution. At operation 230, the results from each remote debug session are received. In some embodiments, the client system will confirm that a message has been received from each remote debug session, e.g., before executing a subsequent command.

Once messages have been received from all debug sessions, the corresponding payloads of those messages will be analyzed at operation 235. In preferred embodiments, the data which is monitored for differences in execution, e.g., variables, pointer values, register values, memory contents, etc., may be automatically compared at each step, breakpoint, or any other type of debugging operation. For example, a command, e.g., a step command, may be issued at client system 110 and communicated to each remote server system debug engine 135. The step command may be executed at each server 130, and the results communicated back to the client 110 regarding the state of the application in each platform. Breakpoints may be communicated in a similar manner. Other examples of debugging commands include run, stop, resume, step over, step into, etc. Other examples of data which may be monitored include states of local variables on a stack, register values of application, states of certain areas of memory such as pointer values, etc.

Advantages of present invention embodiments include the ability to automatically detect differences in data arising from executing programs on different development platforms while stepping through a program. In contrast, existing techniques leave a user to manually compare each variable, register, memory state, etc. during program execution in order to manually identify differences.

At operation 240, differences between the executables, automatically detected at operation 235, may be highlighted and displayed via the UI.

In preferred embodiments, to account for expected small differences in behavior due to known platform differences, e.g., compilers assigning different line numbers or different representation of floating point numbers, etc., an allowable differences file 165 may be constructed to account for known differences. This file may be utilized during the analysis to identify discrepancies caused by other than the known differences, thereby filtering out differences arising from known causes. By filtering data to identify a subset of identified differences without a known cause, the identification and resolution of causes of differences in program execution may be accelerated.

Operation 245 provides an example of a preferred embodiment, within the synchronized common environment, in which an indication is provided in a report or via the common interface regarding possible root causes pertaining to differences in program execution. For example, at the end of the executable run, a report may be automatically generated that summarizes the results and provides hints and suggestions, an indication, regarding possible root causes of differences in execution. Indications may be selected from a pool of known differences between a reference platform and a test platform. For example, when porting from one machine to another, bit ordering can result in differences in code execution. Porting from a little endian machine such as x86 Linux to a big endian machine such as Linux on z may cause bit ordering differences, leading to differences in monitored data. Additionally, other differences may include size of registers, e.g. 32 bits or 64 bits, which may also be determined as a possible root cause for a difference in program execution. Providing an indication as to possible root causes of differences in data may accelerate identification and resolution of variations in program execution as well as lead to the rapid identification of execution differences in which there is no known cause. Once identified, these differences may be included in an allowable difference file.

Figure 2B:
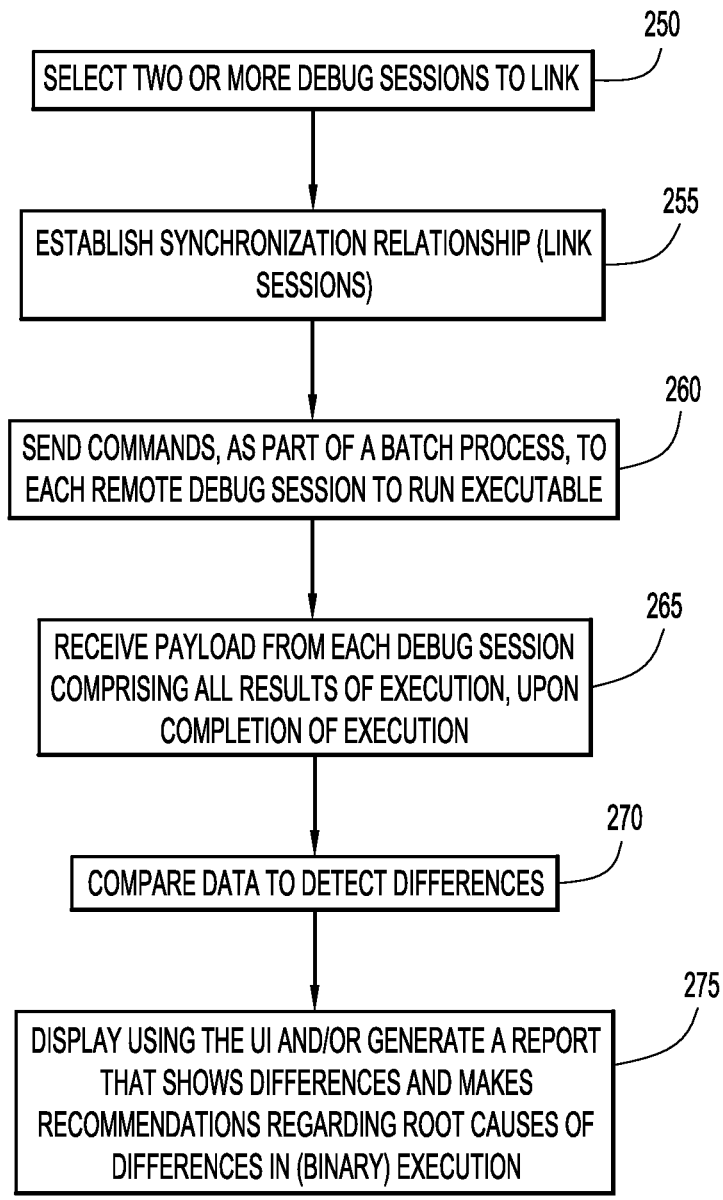
FIG. 2B is an example of a procedural flowchart showing, in a batch mode, comparative program execution across different platforms in accordance with an embodiment of the present invention.

In other embodiments, and as shown in FIG. 2B, the two or more debug sessions may be run in batch mode, which runs non-interactively with a user, and instead, provides results at the end of object compiled code or binary execution (e.g., via debug engines 120, 135, server 130 and/or client 110).

Similar to operation 210, at operation 250, a user selects one or more debug sessions to link. In some aspects, linking may be performed using a handshaking protocol between client system 110 and each server 130 hosting a selected debug session, for establishing the connection for each debug session being controlled. One the debugging sessions are linked, a synchronization relationship is established at operation 255, similar to operation 215.

The client debug engine governs two or more debug sessions, and may be used to control all linked debug sessions and collect data from all sessions simultaneously. At operation 260, commands may be sent, as part of a batch process, to all remote debug sessions simultaneously.

At operation 265, once each remote debugging session has executed the batch file, the results will be packaged and provided in a message to the client system 110. The results in the payload of the message comprise all results of execution, e.g., variables, memory states, etc. In some embodiments, the client system 110 will confirm that a message has been received from each remote debug session.

Once data has been received from each debug session, at operation 270, the corresponding message payloads will be analyzed. The data which is monitored for differences in execution, variables, registers, memory contents, etc., may be automatically compared and identified differences may be displayed to the user via the UI or a generated report at operation 275, similar to operation 245. Accordingly, present invention embodiments provide techniques to execute program(s) in remote environments using a common interface. Once program execution is complete, data may be provided back to the common interface, and the data automatically analyzed to identify differences in program execution. In preferred embodiments, the results may be displayed via a UI or provided in a report. Advantages of present invention embodiments include rapidly identifying differences in program execution in an automated manner, as compared to current techniques utilizing a manually driven, cumbersome process.

In preferred embodiments, to account for expected small differences in behavior due to known platform differences, e.g., compilers assigning different line numbers or different representation of floating point numbers, etc., an allowable differences file 165 may be constructed to account for known differences. This file may be utilized to identify discrepancies caused by other than the known differences.

FIGS. 2A and 2B provide examples of controlling a plurality of debugging processes in a synchronized manner through a client system. Using such techniques, a user may identify and resolve program execution issues in a more efficient manner as compared to manually executing each debugging process. Present invention embodiments also provide for a common environment to synchronize debugging processes running on different platforms. Instead of executing each debugging process independently, which leads to a user manually tracking a large number of variables at various stages in program execution to identify differences, present invention embodiments allow a common interface in which debugging environments may be synchronized and differences in data identified and selected for display in the common interface.

With regard to the examples provided in FIGS. 1A-1C and 2A-2B, differences in pointer values and floating point numbers commonly arise between different platforms.

In general, the debug engine may identify variables that are pointer types to exclude direct comparisons of raw pointer values, as these values will be system dependent. Instead, present invention embodiments will de-reference the pointer to establish the value that the pointer points to, in order to perform a comparison of the de-referenced values. For example, if the pointer points to a structure of a certain type, the value of the respective structure will be compared across the linked engines rather than the values of the pointers. In other embodiments, pointers may reference other pointers, and a user may specify in an allowable differences file how many levels deep to de-reference a given pointer.

Another area of difference is in the handling of floating point numbers between different platforms. For example, different platforms may round values differently to generate differences in values. In such cases, an allowable differences file may comprise information to establish a precision with which to compare floating point values.

As an example, an allowable differences file may comprise a key-value encoding format within a plain text tile, e.g., floating-point-variance=0.01 (to indicate that two floating point values are considered the same if the values are within 0.01% of each other); and max-depth-pointer-level-compare=4 (to limit de-referencing of pointers to four levels deep). In still other embodiments, the user may establish an allowable range of values for a comparison.

In other embodiments, users may automatically add exclusions during the data comparison process itself. For example, when a session identifies a detected difference, the difference may be highlighted and a user may mark the difference as "allowable" or "ignore", for known differences. Thus, the user may train the tool interactively to distinguish between expected/predicted differences and true differences between platforms.

FIG. 3 shows an example of a UI. At section 310, a debug control view is shown, in which each debug session may be selected and linked. At section 320, debug operations may be set, e.g., breakpoint operations, and applied to each debug session. A view of breakpoints is shown as well as the ability to set common breakpoints and determine when a breakpoint is reached. In some embodiments, a user may explicitly specify which point(s) to compare, e.g., at every module load and every module entry point, or any point within a given module, to achieve any desired granularity with respect to line-by-line comparison of data.

At section 330, commands are shown in respective viewing areas as being simultaneously executed in each debugging session. At component 340, differences in monitored data that are automatically identified are displayed.

The various modules (e.g., client debug engine, server debug engine, etc.) may include one or more modules or units to perform the various functions of present invention embodiments described below. The various modules (e.g., client debug engine, server debug engine) may be implemented by any combination of any quantity of software and/or hardware modules or units, and may reside within memory of the server and/or client system for execution by one or more processors.

It will be appreciated that the embodiments described above and illustrated in the drawings represent only a few of the many ways of implementing embodiments for concurrently controlling and linking two or more debug sessions for comparative program execution.

The environment of the present invention embodiments may include any number of computer or other processing systems (e.g., client or end-user systems 110, server systems 130, etc.) and databases 150 or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, debug engines, etc.). These systems may include any types of monitors 170 and input devices 175 (e.g., keyboard, mouse, voice recognition, etc.) to enter and/or view information.

It is to be understood that the software (e.g., client debug engine 120 and server debug engine 135) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, were the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client 110 and server systems 130, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., client debug engine and server debug engine) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data generated as part of object compiled code or binary execution). The database system may be implemented by any number of any conventional or other databases, data stores or storage structures (e.g., files, databases, data structures, data or other repositories, etc.) to store information (e.g., e.g., data generated as part of object compiled code or binary execution). The database system may be included within or coupled to the server and/or client systems. The database systems and/or storage structures may be remote from or local to the computer or other processing systems, and may store any desired data (e.g., variables, register values, pointer values, etc.).

The present invention embodiments may employ any number of any type of user interface (e.g., Graphical User Interface (GUI), command-line, prompt, etc.) for obtaining or providing information (e.g., data generated as part of object compiled code or binary execution). Where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., allowable differences, etc.).

The present invention embodiments are not limited to the specific tasks or algorithms described above, but may be utilized for any processes involving linking multiple applications and monitoring data. For example, present invention embodiments may also be useful in other debugging contexts, e.g., running the same instructions on the same platform to identify hardware defects preventing proper operation of the application, diagnosing a regression introduced by using differential debugging to compare two builds on the same platform, detecting differences between two instances of the same program on the same platform with different input data, etc. Present invention embodiments may also be applied to two or more debug or other sessions, to any data generated or displayed (e.g., values, code, variables, memory, etc.), to any translation of any commands issued from a common interface, to control or compare any environment, and compare values in any manner to identify differences. Present invention embodiments may also be used to identify known differences (e.g., values, code, variables, memory, etc.) in any file format of a corresponding file.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of controlling two or more remote sessions comprising:
    synchronizing two or more remote sessions to control each session to execute a same program using a common interface, wherein the two or more remote sessions include at least two different hardware platforms with different machines having behavioral differences in program execution, and wherein the different hardware platforms include a different representation for a same type of numeric data and the same program is compiled into object code corresponding to the different machines;
    sending one or more executable commands to each remote session simultaneously using the common interface to control operation of that remote session;
    receiving data generated by each remote session from executing the commands;
    analyzing the received data from each remote session to identify a plurality of differences in data generated by each remote session due to the differences in the program execution by the different hardware platforms;
    filtering out a subset of the identified differences within a larger set of the identified differences based on known differences in program execution of the different hardware platforms to produce a resulting set of identified differences, wherein the subset of the identified differences includes a difference between numeric values of the different representations of the same type of numeric data residing within a predefined range; and
    displaying on the common interface, the resulting set of identified differences in the data.

2. The computer-implemented method of claim 1, wherein the executable commands are generated by a user of the common interface.

3. The computer-implemented method of claim 1, wherein the executable commands are provided in the form of a batch file.

4. The computer-implemented method of claim 1, further comprising:
    providing an indication regarding possible root causes of the differences in the data generated by each remote session.

5. The computer-implemented method of claim 1, wherein each remote session includes a program debug session.

6. The computer-implemented method of claim 5, wherein the data includes one or more of register values, pointer values, or values stored in memory.

7. The computer-implemented method of claim 1, further comprising:
    generating a report comprising the resulting set of identified differences in the data.

8. A system for controlling two or more remote sessions comprising:
    at least one processor configured to:
        synchronize two or more remote sessions to control each session to execute a same program using a common interface, wherein the two or more remote sessions include at least two different hardware platforms with different machines having behavioral differences in program execution, and wherein the different hardware platforms include a different representation for a same type of numeric data and the same program is compiled into object code corresponding to the different machines;
        send one or more executable commands to each remote session simultaneously using the common interface to control operation of that remote session;
        receive data generated by each remote session from executing the commands;
        analyze the received data from each remote session to identify a plurality of differences in data generated by each remote session due to the differences in the program execution by the different hardware platforms;
        filter out a subset of the identified differences within a larger set of the identified differences based on known differences in program execution of the different hardware platforms to produce a resulting set of identified differences, wherein the subset of the identified differences includes a difference between numeric values of the different representations of the same type of numeric data residing within a predefined range; and
        display on the common interface, the resulting set of identified differences in the data.

9. The system of claim 8, wherein the executable commands are generated by a user of the common interface.

10. The system of claim 8, wherein the executable commands are provided in the form of a batch file.

11. The system of claim 8, wherein the at least one processor is configured to provide an indication regarding possible root causes of the differences in the data generated by each remote session.

12. The system of claim 8, wherein each remote session includes a program debug session.

13. The system of claim 12, wherein the data includes one or more of register values, pointer values, or values stored in memory.

14. The system of claim 8, wherein the processor is configured to generate a report comprising the resulting set of identified differences in the data.

15. A computer program product for controlling two or more remote sessions comprising a computer readable storage medium having computer readable program instructions embodied therewith, the computer readable program instructions, when executed by a processor, causes the processor to:
    synchronize two or more remote sessions to control each session to execute a same program using a common interface, wherein the two or more remote sessions include at least two different hardware platforms with different machines having behavioral differences in program execution, and wherein the different hardware platforms include a different representation for a same type of numeric data and the same program is compiled into object code corresponding to the different machines;
    send one or more executable commands to each remote session simultaneously using the common interface to control operation of that remote session;

receive data generated by each remote session from executing the commands;

analyze the received data from each remote session to identify a plurality of differences in data generated by each remote session due to the differences in the program execution by the different hardware platforms;

filter out a subset of the identified differences within a larger set of the identified differences based on known differences in program execution of the different hardware platforms to produce a resulting set of identified differences, wherein the subset of the identified differences includes a difference between numeric values of the different representations of the same type of numeric data residing within a predefined range; and display on the common interface, the resulting set of identified differences in the data.

16. The computer program product of claim 15, wherein the executable commands are generated by a user of the common interface or are provided in the form of a batch file.

17. The computer program product of claim 15, wherein the computer program product is configured to cause the processor to provide an indication regarding possible root causes of the differences in the data generated by each remote session.

18. The computer program product of claim 15, wherein the data includes one or more of register values, pointer values, or values stored in memory, returned from each remote session having a program debug session.

19. The computer program product of claim 15, wherein the computer program product is configured to cause the processor to generate a report comprising the resulting set of identified differences in the data.

* * * * *